(12) United States Patent
Dang

(10) Patent No.: US 9,346,593 B2
(45) Date of Patent: *May 24, 2016

(54) TAMPER RESISTANT CLOSURE MECHANISM FOR A UTILITY VAULT

(71) Applicant: Oldcastle Precast, Inc., Auburn, WA (US)

(72) Inventor: Nguyen Thai Dang, Madera, CA (US)

(73) Assignee: Oldcastle Precast, Inc., Auburn, WA (US)

( * ) Notice: Subject to any disclaimer, the term of this patent is extended or adjusted under 35 U.S.C. 154(b) by 275 days.

This patent is subject to a terminal disclaimer.

(21) Appl. No.: 13/851,809

(22) Filed: Mar. 27, 2013

(65) Prior Publication Data

US 2013/0248534 A1 Sep. 26, 2013

Related U.S. Application Data

(63) Continuation-in-part of application No. 13/294,054, filed on Nov. 10, 2011, now Pat. No. 8,835,757.

(60) Provisional application No. 61/616,125, filed on Mar. 27, 2012.

(51) Int. Cl.
*H02G 9/10* (2006.01)
*B65D 50/00* (2006.01)
*B21D 53/24* (2006.01)
*F16B 37/00* (2006.01)
*F16B 37/02* (2006.01)

(52) U.S. Cl.
CPC ................ *B65D 50/00* (2013.01); *B21D 53/24* (2013.01); *F16B 37/00* (2013.01); *F16B 37/02* (2013.01); *H02G 9/10* (2013.01)

(58) Field of Classification Search
CPC ........... H02G 9/10; F16B 37/04; F16B 37/02; F16B 37/043
USPC .............. 174/60, 37, 545, 562; 411/177, 179; 220/484, 3.8

See application file for complete search history.

(56) References Cited

U.S. PATENT DOCUMENTS

| 2,367,659 | A | * | 1/1945 | Burke | ...................... F16B 37/02 411/436 |
| 3,039,666 | A |   | 6/1962 | Carpenter, Sr. |
| 3,385,012 | A |   | 5/1968 | Lovegreen |
| 3,530,696 | A |   | 9/1970 | Dunmire |

(Continued)

FOREIGN PATENT DOCUMENTS

EP          0529178         3/1993

OTHER PUBLICATIONS

Brooks Products Meter Boxes and Pull Boxes, drawing revision date Dec. 6, 2000, 17 pages.

(Continued)

*Primary Examiner* — King M Chu
(74) *Attorney, Agent, or Firm* — Sheridan Ross P.C.

(57) ABSTRACT

A nut configured to threadably engage an external thread of a bolt is provided. The nut generally comprises an upper portion that defines a first thread, a lower portion that defines a second thread, and a sidewall portion that connects the upper portion and the lower portion. The upper portion may be separated from the lower portion by a gap, and the sidewall portion may include a first sidewall spaced apart from a second sidewall.

13 Claims, 14 Drawing Sheets

(56) References Cited

U.S. PATENT DOCUMENTS

| | | | | |
|---|---|---|---|---|
| 3,720,251 A | * | 3/1973 | Sygnator | F16B 37/02 411/276 |
| 3,858,614 A | * | 1/1975 | Moore | H02G 9/065 138/105 |
| 3,921,494 A | | 11/1975 | Coe | |
| 3,974,599 A | | 8/1976 | Grosh | |
| D244,173 S | | 5/1977 | Thurman | |
| 4,163,503 A | * | 8/1979 | McKinnon | H02G 9/10 137/371 |
| 4,204,419 A | | 5/1980 | Cale | |
| 4,266,380 A | | 5/1981 | Samolis | |
| D279,952 S | | 8/1985 | Daenen et al. | |
| 4,567,697 A | | 2/1986 | Hahne | |
| 4,729,706 A | * | 3/1988 | Peterson | F16B 37/041 411/112 |
| 4,797,045 A | * | 1/1989 | Lautenschlager, Jr. | E05B 5/0276 411/107 |
| 4,863,059 A | * | 9/1989 | Christensen | E04F 19/08 220/3.8 |
| 4,883,397 A | * | 11/1989 | Dubost | F16B 2/245 24/563 |
| 4,897,005 A | * | 1/1990 | Peterson | F16B 37/041 411/112 |
| 4,911,594 A | * | 3/1990 | Fisher | F16B 37/02 411/247 |
| 4,973,191 A | | 11/1990 | Dannhauser | |
| 4,998,332 A | * | 3/1991 | Dacey, Jr. | B62D 25/163 29/525.02 |
| 5,026,235 A | * | 6/1991 | Muller | B25B 31/00 411/175 |
| 5,123,776 A | | 6/1992 | Lang et al. | |
| 5,134,758 A | | 8/1992 | Christensen | |
| 5,152,651 A | | 10/1992 | Artéon | |
| 5,176,482 A | * | 1/1993 | Reinl | F16B 5/025 403/387 |
| 5,197,307 A | * | 3/1993 | Abbott, Jr. | E05B 65/006 52/220.1 |
| 5,249,901 A | * | 10/1993 | Moore | F16B 37/02 29/525.04 |
| 5,330,303 A | * | 7/1994 | Dubost | F16B 37/041 411/21 |
| 5,378,097 A | * | 1/1995 | Barnavol | F16B 37/02 411/183 |
| D355,118 S | | 2/1995 | Dickinson et al. | |
| D357,161 S | | 4/1995 | Booten | |
| D361,511 S | | 8/1995 | Dickinson et al. | |
| 5,462,383 A | * | 10/1995 | Van 'T Veer | E01C 11/227 404/4 |
| D367,211 S | | 2/1996 | Cautereels | |
| D373,953 S | | 9/1996 | Gale | |
| D376,693 S | | 12/1996 | Wolff | |
| D379,138 S | | 5/1997 | Carlson | |
| D382,112 S | | 8/1997 | Egan | |
| 5,694,719 A | * | 12/1997 | Bejune | B60J 5/0402 411/182 |
| 5,697,729 A | * | 12/1997 | Bowman | E02D 29/1427 404/25 |
| D394,550 S | | 5/1998 | Tanji | |
| 5,782,584 A | * | 7/1998 | Arthur | H02G 1/14 220/908 |
| 5,829,215 A | | 11/1998 | Billing | |
| 5,855,461 A | * | 1/1999 | Tripi | F16B 37/043 411/182 |
| 5,919,019 A | * | 7/1999 | Fischer | F16B 37/043 411/112 |
| 5,951,223 A | * | 9/1999 | Lindquist | F16B 37/02 411/104 |
| D417,361 S | | 12/1999 | Mittmann et al. | |
| 6,000,576 A | | 12/1999 | Liu | |
| 6,006,414 A | * | 12/1999 | Corporon | F16B 37/041 29/525.02 |
| 6,007,270 A | | 12/1999 | Bowman | |
| D426,064 S | | 6/2000 | Douglas et al. | |
| 6,087,582 A | * | 7/2000 | Arthur | 174/37 |
| 6,106,207 A | * | 8/2000 | Kuzdak, III | F16B 41/002 411/107 |
| 6,164,885 A | * | 12/2000 | Roytberg | F16B 37/02 411/173 |
| 6,261,039 B1 | * | 7/2001 | Reed | B23P 6/04 411/178 |
| 6,283,689 B1 | * | 9/2001 | Roytberg | F16B 37/02 411/182 |
| D469,607 S | | 2/2003 | Wolff | |
| 6,772,566 B1 | * | 8/2004 | Machledt | H02G 9/10 220/4.02 |
| 6,811,119 B1 | | 11/2004 | Petersen et al. | |
| 6,899,240 B2 | * | 5/2005 | Dang | E03B 7/095 220/3.8 |
| 6,932,099 B2 | * | 8/2005 | Mahaney | H02G 9/10 137/15.08 |
| D510,802 S | | 10/2005 | Sagol | |
| 6,953,209 B2 | | 10/2005 | Jackson et al. | |
| 7,009,513 B2 | | 3/2006 | Dang | |
| 7,030,315 B1 | * | 4/2006 | Dunn | H02G 9/10 174/17 R |
| D531,802 S | | 11/2006 | Zimmerman | |
| 7,163,352 B2 | | 1/2007 | Jurich et al. | |
| D547,175 S | | 7/2007 | Berg | |
| 7,385,137 B2 | * | 6/2008 | Burke et al. | 174/50 |
| 7,467,910 B2 | | 12/2008 | Lecuyer et al. | |
| 7,500,412 B1 | | 3/2009 | Maciejewski | |
| 7,501,573 B2 | | 3/2009 | Balfour, Jr. | |
| D590,709 S | | 4/2009 | Fitzsimmons | |
| D598,197 S | | 8/2009 | Ahlstrom | |
| D606,306 S | | 12/2009 | Monte | |
| 7,748,926 B2 | | 7/2010 | Jurich et al. | |
| D622,061 S | | 8/2010 | Higginson | |
| 7,807,923 B2 | * | 10/2010 | Moran | 174/50 |
| 7,891,904 B2 | | 2/2011 | Stadler | |
| D639,065 S | | 6/2011 | Duvigneau | |
| D640,138 S | | 6/2011 | Lee | |
| D648,538 S | | 11/2011 | Reinhart et al. | |
| 8,061,928 B2 | | 11/2011 | Jurich et al. | |
| D654,693 S | | 2/2012 | Freeman | |
| 8,113,740 B2 | | 2/2012 | Boulton et al. | |
| D662,323 S | | 6/2012 | Jurich et al. | |
| 8,302,796 B1 | * | 11/2012 | Johnson | H02G 9/10 174/66 |
| D682,553 S | | 5/2013 | Jurich et al. | |
| 8,469,628 B2 | | 6/2013 | Miller et al. | |
| D696,526 S | | 12/2013 | Christensen | |
| 8,821,062 B2 | | 9/2014 | Miller et al. | |
| 9,021,842 B2 | | 5/2015 | Rix | |
| 2002/0100146 A1 | * | 8/2002 | Ko | B60J 3/0217 24/295 |
| 2003/0202857 A1 | * | 10/2003 | Lowry | F16B 35/041 411/182 |
| 2003/0206785 A1 | * | 11/2003 | Hoffmann | F16B 37/045 411/84 |
| 2004/0042849 A1 | | 3/2004 | Jurich et al. | |
| 2007/0194493 A1 | | 8/2007 | Jurich et al. | |
| 2008/0095592 A1 | * | 4/2008 | Spitz | F16B 37/043 411/174 |
| 2008/0159824 A1 | * | 7/2008 | Okada | F16B 37/02 411/177 |
| 2008/0169392 A1 | * | 7/2008 | McClure | G01D 4/002 248/226.11 |
| 2008/0226417 A1 | * | 9/2008 | Spitz | F16B 37/0807 411/170 |
| 2008/0247842 A1 | * | 10/2008 | Motsch | F16B 37/02 411/174 |
| 2009/0226260 A1 | | 9/2009 | Boulton et al. | |
| 2010/0040433 A1 | | 2/2010 | Poppe et al. | |
| 2010/0132168 A1 | * | 6/2010 | Coffland | F16B 2/241 24/517 |
| 2010/0296865 A1 | | 11/2010 | Jurich et al. | |
| 2010/0310338 A1 | | 12/2010 | Diez Herrera | |
| 2010/0329782 A1 | | 12/2010 | Miller et al. | |
| 2011/0203334 A1 | | 8/2011 | Rix | |
| 2012/0073106 A1 | | 3/2012 | Jurich et al. | |
| 2012/0111866 A1 | | 5/2012 | Freeman | |
| 2012/0228302 A1 | * | 9/2012 | Byrns | H02G 9/10 |

(56) References Cited

U.S. PATENT DOCUMENTS

2013/0263425 A1  10/2013  Miller et al.
2014/0138387 A1* 5/2014  Dang ............... E02D 29/1427
                                              220/484

OTHER PUBLICATIONS

Brooks Products Meter Boxes and Pull Boxes, drawing revision date Jan. 9, 2001, 4 pages.
Applicant's Admitted Prior Art: Eisel Enterprises Inc. Precast Concrete Products, date unknown, 21 pages.
Applicant's Admitted Prior Art: US Concrete Precast Group Products, date unknown, 9 pages.
Notice of Allowance for Design U.S. Appl. No. 29/378,870, mailed Nov. 4, 2011, 9 pages.
Notice of Allowance for Design U.S. Appl. No. 29/386,380, mailed Feb. 29, 2012, 9 pages.
Official Action for Design U.S. Appl. No. 29/424,306, mailed Sep. 13, 2012, 7 pages.
Notice of Allowance for Design U.S. Appl. No. 29/424,306, mailed Jan. 7, 2013, 5 pages.
Official Action for U.S. Appl. No. 13/294,054, mailed Feb. 27, 2014, 11 pages.
Notice of Allowance for U.S. Appl. No. 13/294,054, mailed Jun. 23, 2014, 7 pages.
Official Action for U.S. Appl. No. 14/081,829, mailed Jan. 13, 2015, 6 pages. Restriction Requirement.
Official Action for U.S. Appl. No. 14/486,662, mailed Mar. 27, 2015 7 pages.
Notice of Allowance for U.S. Appl. No. 14/486,662, mailed Jul. 8, 2015 9 pages.
Official Action for U.S. Appl. No. 14/081,829, mailed Apr. 24, 2015 13 pages.

* cited by examiner

TAMPER RESISTANT CLOSURE MECHANISM FOR A UTILITY VAULT

This Non-Provisional Application claims the benefit of priority from U.S. Provisional Patent Application No. 61/616,125, filed Mar. 27, 2012, the entire disclosure of which is hereby incorporated by reference in its entirety. This Application is a Continuation-in-Part of U.S. patent application Ser. No. 13/294,054, filed Nov. 10, 2011, the entire disclosure of which is hereby incorporated by reference in its entirety.

FIELD

The present disclosure generally relates to attachment hardware, and more specifically to fasteners for securing components. Nuts specifically adapted for receiving a bolt and quickly securing the two are provided.

BACKGROUND

Subgrade vaults are widely used to house underground connections of electrical cables and water lines. The following references relate to the field of subgrade storage vaults and facilities and are hereby incorporated by reference herein in their entireties: U.S. Pat. No. 4,567,697; U.S. Pat. No. 6,772,566; U.S. Pat. No. 6,899,240; U.S. Pat. No. 7,163,352; U.S. Pat. No. 7,385,137; U.S. Pat. No. 7,467,910; and U.S. Pat. No. 7,748,926. In part due to the high commodity prices of metals and other internal components, theft is an increasing problem which results in expensive replacement costs and extensive periods of downtime, including interruptions in communication, electrical, and/or water service. In response to the increasing theft rate, lockable lids have been utilized in connection with the subgrade vaults to prevent unauthorized access to the contents of the vaults.

The lockable vaults generally utilize an externally-threaded bolt and a corresponding internally-threaded nut. The lockable vaults have been useful in preventing theft. However, the lockable vaults have created problems for authorized individuals who need access to the vault contents. For example, in many situations, the threaded bolt becomes stuck, seized, rusted, corroded, or otherwise impossible to remove from the lockable vault. In these situations, the authorized individual spends vast amounts of time trying to remove the vault lid to access the vault's contents. In many circumstances, the lid is destroyed in an attempt to remove the bolt.

Thus, it is desirable to provide a nut configured for threadably engaging a threaded bolt that reduces the galling, sticking, seizing, rusting, corrosion, and other common issues that increase the difficulty of removing a bolt from a nut. Although the aforementioned problems have been discussed in particular to subgrade vaults, it should be appreciated that the nut of the present disclosure can be utilized in applications beyond subgrade vaults.

SUMMARY

The present disclosure is generally directed to systems and methods which provide a double-thread speed nut. It is one aspect of the present disclosure to provide a nut with an increased torque capability. In one embodiment, a nut comprises an upper portion that defines a first thread, a lower portion that defines a second thread, and a sidewall portion that connects the first thread and the second thread. The first thread and the second thread together form a double thread. Generally, the addition of the second thread increases the torque capability of the nut.

In various embodiments, features of the present invention are contemplated as being provided with or useful for securing a utility vault, such as a sub-grade utility vault with a cap and a lid. U.S. Patent Application Publication No. 2012/0111866 filed Nov. 10, 2011 relates to such vaults and enclosures and is hereby incorporated by reference in its entirety.

It is another aspect of the present disclosure to provide a nut that reduces the galling, sticking, seizing, rusting, corrosion, and/or other common issues that increase the difficulty of removing a bolt from a nut. In one embodiment, a nut comprises an upper portion that defines a first thread, a lower portion that defines a second thread, and a sidewall portion that connects the first thread and the second thread. The upper portion is spaced apart from the lower portion by a gap, and the sidewall portion comprises a first sidewall spaced apart from a second sidewall. The gap between the upper portion and the lower portion, along with the open sidewall portion, provides an exit path for dirt and/or debris lodged within the nut. Removal of the dirt and/or debris reduces the likelihood of rusting and/or corrosion. In addition, dirt and/or debris removal reduces heat generation during engagement of a bolt and the nut, thereby reducing the likelihood of galling, sticking, and/or seizing.

It is another aspect of the present disclosure to provide a nut that can act as a substitute for other types of nuts. In one embodiment, a nut is provided that can function as a substitute for a square nut. For example, in one configuration, a nut can be manufactured to match any size of square nut, including height, width, and length.

It is yet another aspect of the present disclosure to provide a method of manufacturing a nut. In one embodiment, a substantially planar strip of material having a first end, a second end, a first side, and a second side is utilized. A first aperture is formed near the center of the strip, and an arcuate portion is formed near the first end and the second end of the strip. The first end and the second end of the strip are folded, or bent, downward relative to the planar strip to define a first sidewall and a second sidewall. The first end and the second end of the strip are further folded, or bent, relative to the first sidewall and the second sidewall, respectively, so that the arcuate portion associated with the first end of the strip opposes the arcuate portion associated with the second end of the strip to define a second aperture that is axially aligned with the first aperture. In this fashion, a nut having a double thread can be formed from a unitary strip of material.

It is yet a further aspect of the present disclosure to provide a nut constructed of materials now known or later developed in the art. In one embodiment, a nut is constructed of a metallic or a non-metallic material. For example, a metallic nut may be constructed of, but is not limited to, aluminum, brass, copper, nickel, steel, titanium, zinc, and various alloys constructed thereof, e.g., stainless steel. As another example, a non-metallic nut may be constructed of, but is not limited to, various plastics including, but not limited to, acetal, fiberglass, nylon, polyether ether ketone (PEEK), polycarbonate, polypropylene, polytetrafluoroethylene (PTFE), and polyvinylchloride (PVC). In another embodiment, a nut may include a finish. A finish may include, but is not limited to, armor coating with silver-gray polymer, blackening with black luster or black oxide, cadmium plating, hot-dipped galvanizing, PTFE coating, or zinc plating.

Various embodiments of the present invention contemplate accommodating torque values up to approximately 70 ft-lbs. It will be recognized, however, that maximum or recommended torque values for embodiments of the present invention will vary based on associated materials, such as the material of an associated utility vault cover. In various embodiments, maximum recommended torque values are between approximately 5 ft-lbs and 70 ft-lbs. In certain embodiments, approximately 27 ft-lbs is provided as a recommended maximum torque value.

As used herein, a "bolt" generally describes a fastener with a threaded shank intended to be used with a nut to clamp an assembly together. The same type of fastener is generally referred to as a screw when it is threaded into a hole rather than used with a nut. In addition, as used herein, the terms "first", "second", "third", and "fourth" are not intended to connote importance or priority, but are used to distinguish one feature from another. Further, as used herein, the terms "upper", "lower", "side", "vertical", and "horizontal" are not intended to limit a feature to a particular orientation. Rather, the aforementioned terms are utilized for convenience, and the nut disclosed herein can be positioned in a variety of orientations for use.

The phrases "at least one", "one or more", and "and/or", as used herein, are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity, as used herein, refers to one or more of that entity. As such, the terms "a" (or "an"), "one or more" and "at least one" can be used interchangeably herein.

The use of "including," "comprising," or "having" and variations thereof herein is meant to encompass the items listed thereafter and equivalents thereof as well as additional items. Accordingly, the terms "including," "comprising," or "having" and variations thereof can be used interchangeably herein.

It shall be understood that the term "means" as used herein shall be given its broadest possible interpretation in accordance with 35 U.S.C., Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary of the invention, brief description of the drawings, detailed description, abstract, and claims themselves.

The Summary is neither intended nor should it be construed as being representative of the full extent and scope of the present disclosure. The present disclosure is set forth in various levels of detail in the Summary as well as in the attached drawings and the Detailed Description and no limitation as to the scope of the claimed subject matter is intended by either the inclusion or non-inclusion of elements, components, etc. in this Summary. Moreover, reference made herein to "the present invention" or aspects thereof should be understood to mean certain embodiments of the present disclosure and should not necessarily be construed as limiting all embodiments to a particular description.

BRIEF DESCRIPTION OF THE DRAWINGS

The accompanying drawings, which are incorporated in and constitute a part of the specification, illustrate embodiments of the disclosure and together with the general description given above and the detailed description of the drawings given below, serve to explain the principles of these embodiments.

Figure 1:
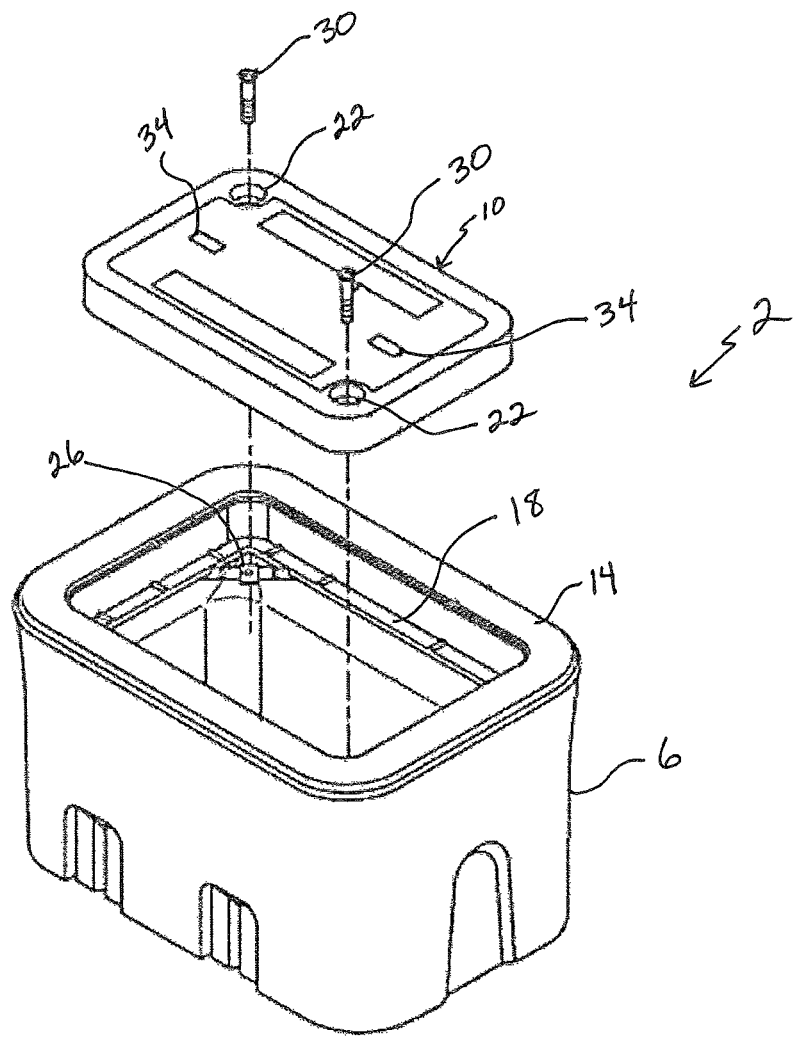
FIG. 1 is a front perspective view of a prior art subgrade vault.

It should be understood that the drawings are not necessarily to scale. In certain instances, details that are not necessary for an understanding of the disclosure or that render other details difficult to perceive may have been omitted. It should be understood, of course, that the claimed subject matter is not necessarily limited to the particular embodiments illustrated herein.

To assist in the understanding of the drawings, the following is a list of components and associated numbering found in the drawings:

| # | Components |
|---|---|
| 2 | Subgrade vault |
| 6 | Main body portion |
| 10 | Lid |
| 14 | Cap |
| 18 | Shelf portion |
| 22 | Aperture |
| 26 | Clip nut |
| 30 | Bolt |
| 34 | Lift interface |
| 38 | Double-thread speed nut |
| 42 | Nut receptacle |
| 46 | Shoulder |
| 50 | Recessed region |
| 54 | Nut retainer |
| 58 | Fastener |
| 62 | External thread |
| 66 | UNC thread bolt |
| 70 | Coil-thread bolt |
| 74 | Lag, or auger, bolt |
| 78 | Upper portion (of double-thread speed nut) |
| 82 | Lower portion (of double-thread speed nut) |
| 86 | Sidewall portion (of double-thread speed nut) |
| 90 | First bridge (of upper portion) |
| 94 | Second bridge (of upper portion) |
| 98 | First upper portion plate (or third plate) |
| 102 | Second upper portion plate (or fourth plate) |
| 106 | Upper surface (of upper portion) |
| 110a | Leading edge (of first upper portion plate) |
| 110b | Leading edge (of second upper portion plate) |
| 114a | Arcuate portion (of first upper portion plate) |
| 114b | Arcuate portion (of second upper portion plate) |
| 118 | Upper portion aperture (or first aperture) |
| 122 | First foot segment |
| 126 | Second foot segment |
| 130 | Third foot segment |
| 134 | Fourth foot segment |
| 138 | First lower portion plate (or first plate) |
| 142 | Second lower portion plate (or second plate) |
| 146 | Upper surface (of lower portion) |
| 150a | Leading edge (of first lower portion plate) |
| 150b | Leading edge (of second lower portion plate) |
| 154a | Arcuate portion (of first lower portion plate) |
| 154b | Arcuate portion (of second lower portion plate) |
| 158 | Lower portion aperture (or second aperture) |
| 162 | First sidewall (of sidewall portion) |
| 166 | Second sidewall (of sidewall portion) |
| 170 | Strip |
| 174 | First end (of strip) |
| 178 | Second end (of strip) |
| 182 | First side (of strip) |
| 186 | Second side (of strip) |
| 200 | Nut |
| 202 | First member |
| 204 | Second member |
| 206 | First bridge |
| 208 | Second bridge |
| 210 | Upper portion |
| 212 | Aperture |
| 214 | First downwardly sloping feature |
| 216 | Second downwardly sloping feature |
| 218 | First bridge member |
| 220 | Second bridge member |
| 222 | Aperture |
| 224 | First downwardly sloping feature |
| 226 | Second downwardly sloping feature |
| 228 | Upper surface |
| 230 | Width |
| 232 | Gap |
| 234 | Height |
| 236 | Tolerance |
| 300 | Bolt |
| 302 | Bracket |
| 304 | Extension Member |
| 306 | Aperture |
| 308 | Peripheral Portion |
| 310 | Through-hole |

DETAILED DESCRIPTION

With reference to FIG. 1, a subgrade vault 2, which is known in the art, is depicted. The subgrade vault 2 includes a main body portion 6 and a lid 10. The main body portion 6 includes four sidewalls and is generally open at a top and a bottom. The main body portion 6 may be constructed of a concrete material, a polymer, combinations thereof, or any other materials now known or later developed in the art. A cap 14 may be connected to the top of the main body portion 6.

Typically, the lid 10 is sized to rest upon a shelf portion 18, which is interconnected to the main body portion 6 of the subgrade vault 2, such that an upper surface of the lid 10 is generally flush with an upper surface of the cap 14 when the lid 10 is in a closed position. The lid 10 is provided with at least one aperture 22 that aligns with a clip nut 26 when the lid 10 is in a closed position. Thus, at least one bolt 30 may be placed through the at least one aperture 22 of the lid 10 and threadably engage the clip nut 26 to lock the lid in place. A tamper-proof or tamper-resistant bolt 30 may be utilized to protect the contents of the subgrade vault 2 from those lacking proper tools (e.g., specialty tools).

Although not shown in FIG. 1, selectively removable caps or covers may be provided to protect the at least one bolt 30 from the elements, render them less obvious to potential trespassers, and/or create a more uniform and aesthetically pleasing upper portion of the lid 10. In addition, a lid 10 may comprise at least one lift interface 34 for providing a point of attachment for various devices designed to lift or displace the lid. Lift interfaces 34 may comprise a recess having a rigid member or post adapted for grasping or communicating with a lifting device comprising a hook, as will be recognized by one of ordinary skill in the art.

Figure 2:
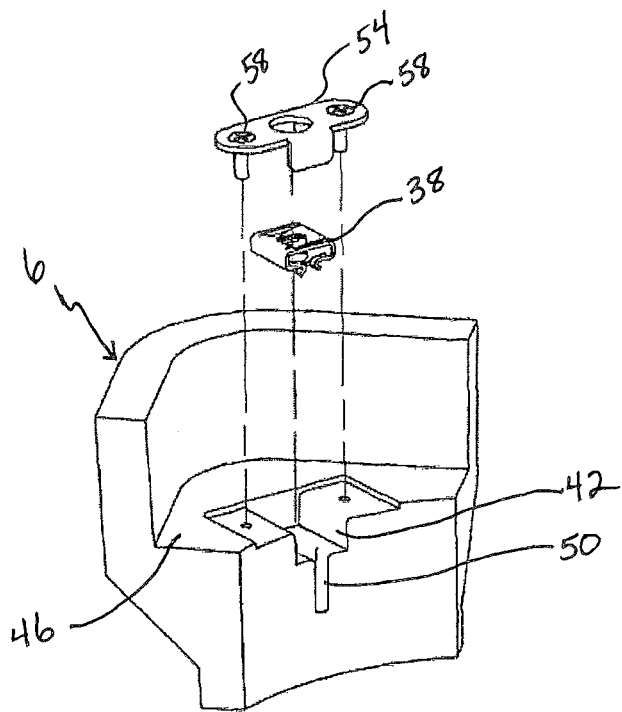
FIG. 2 is a partially fragmented exploded perspective view of one embodiment of a double-thread speed nut being utilized with a subgrade vault.
Figure 3:
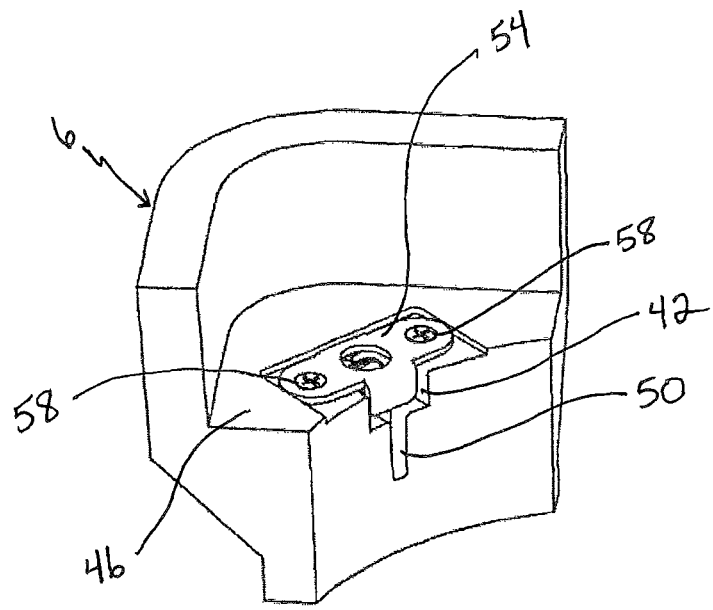
FIG. 3 is a perspective view of the double-thread speed nut shown in FIG. 2 retained in a receptacle formed in a main body portion of a subgrade vault.

Referring to FIG. 2 and FIG. 3, one embodiment of a double-thread speed nut 38 being utilized with a main body portion 6 of a subgrade vault 2 is provided. The main body portion 6 depicted in FIGS. 2-3 is slightly modified from the main body portion depicted in FIG. 1. As illustrated in FIGS. 2-3, the main body portion 6 includes a nut receptacle 42 formed in a shoulder 46. A recessed region 50 is formed below the nut receptacle 42 and is configured to accommodate a portion of a bolt. For example, the recessed region 50 may include a central opening configured to receive a bolt shank and a slot configured to accommodate the egress of dirt and/or debris. To assemble the unit, the double-thread speed nut 38 is placed in the nut receptacle 42, the nut retainer 54 is positioned over the double-thread speed nut 38, and the nut retainer 54 is secured to the main body portion 6 with fasteners 58. In one embodiment, the double-thread speed nut 38 floats in the space defined by the nut receptacle 42 and the nut retainer 54. The floating capability allows the double-thread speed nut 38 to move within the nut receptacle 42 to accommodate variations in bolt and/or lid 10 sizes. In one embodiment, the double-thread speed nut 38 includes feet configured to allow the nut 38 to float within the nut receptacle 42. For example, in one configuration, the feet are spaced apart from each other a predetermined distance to prevent a foot from entering the recessed region 50. In addition, in one configuration, the feet provide clearance for a second thread to prevent the second thread from contacting a surface of the nut receptacle 42. In another configuration, the feet may be configured to alter the height of the double-thread speed nut 38. For example, the feet may be configured to alter the height of the double-thread speed nut 38 to match a height of a square nut. In one embodiment, the double-thread speed nut 38 is rectangular to prevent the nut 38 from spinning within the nut receptacle 42. For example, in one configuration, the double-thread speed nut 38 has a generally rectangular geometry. After the double-thread speed nut 38 is secured in the nut receptacle 42, a lid 10 may be positioned on the shoulder 42 and fastened to the main body portion 6 of the subgrade vault 2 with a bolt 30 that threadably engages the double-thread speed nut 38.

Figure 4:
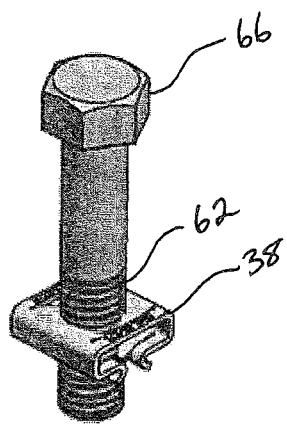
FIG. 4 is a front perspective view of one embodiment of a double-thread speed nut threadably engaged with a UNC bolt.
Figure 5:
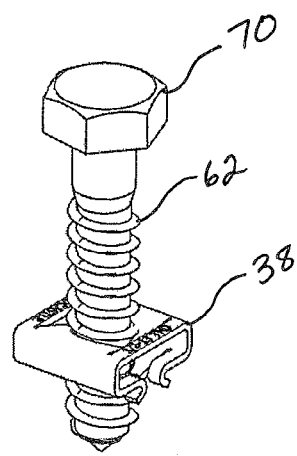
FIG. 5 is a front perspective view of the double-thread speed nut shown in FIG. 4 threadably engaged with an auger bolt.
Figure 6:
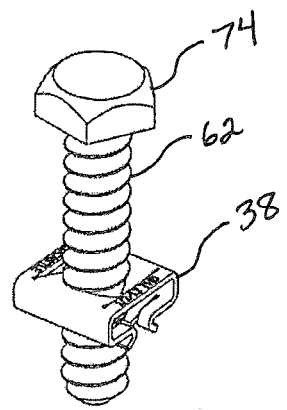
FIG. 6 is a front perspective view of the double-thread speed nut shown in FIG. 4 threadably engaged with a coil thread bolt.
Figure 7:
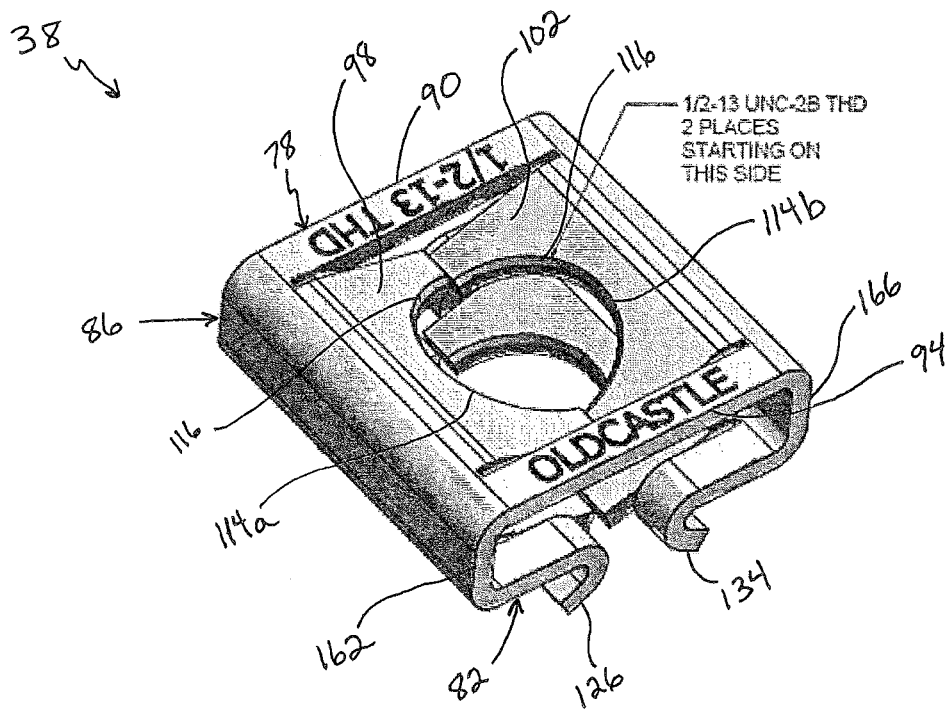
FIG. 7 is a front top perspective view of one embodiment of a double-thread speed nut.
Figure 8:
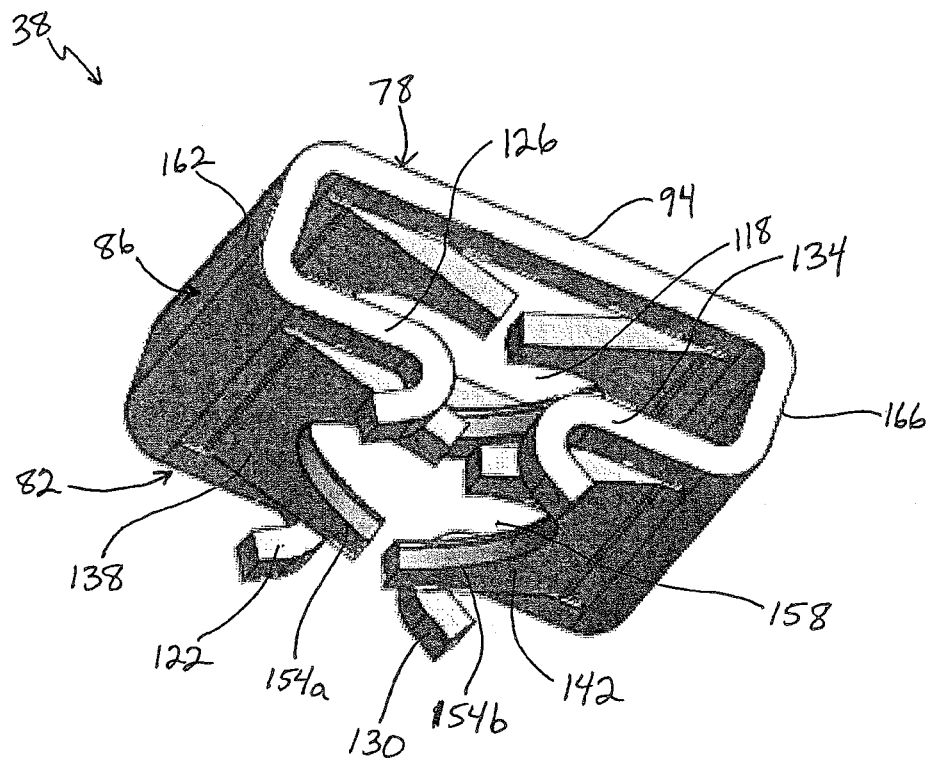
FIG. 8 is a front bottom perspective view of the double-thread speed nut shown in FIG. 7.
Figure 9:
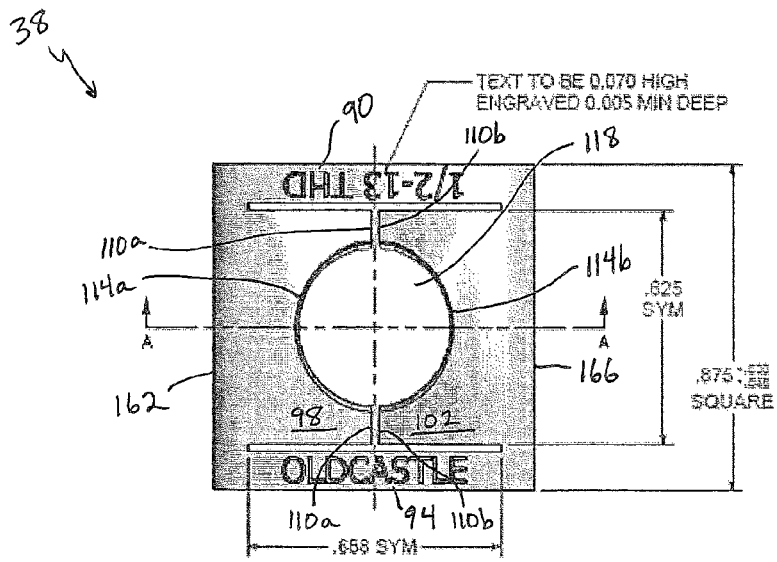
FIG. 9 is a top plan view of the double-thread speed nut shown in FIG. 7.
Figure 10:
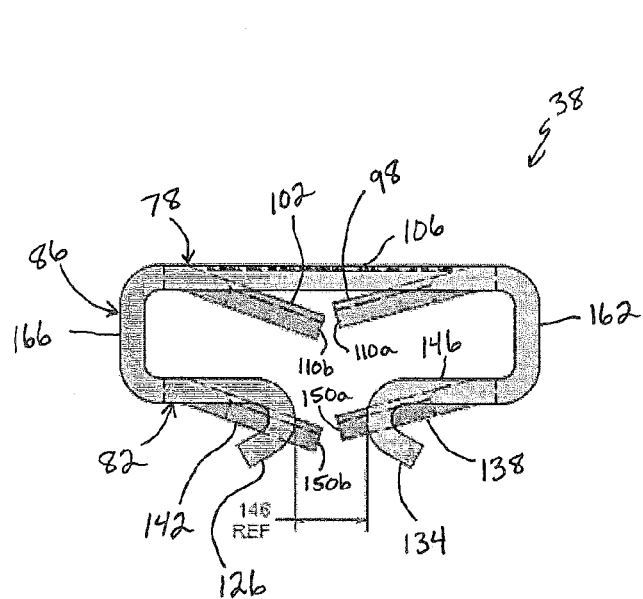
FIG. 10 is a back elevation view of the double-thread speed nut shown in FIG. 9.
Figure 11:
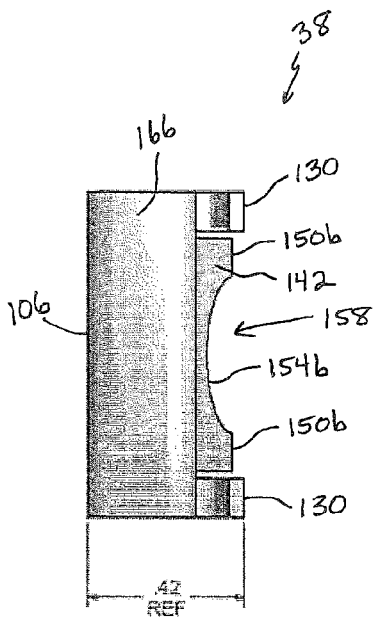
FIG. 11 is a right side view of the double-thread speed nut shown in FIG. 9.
Figure 12:
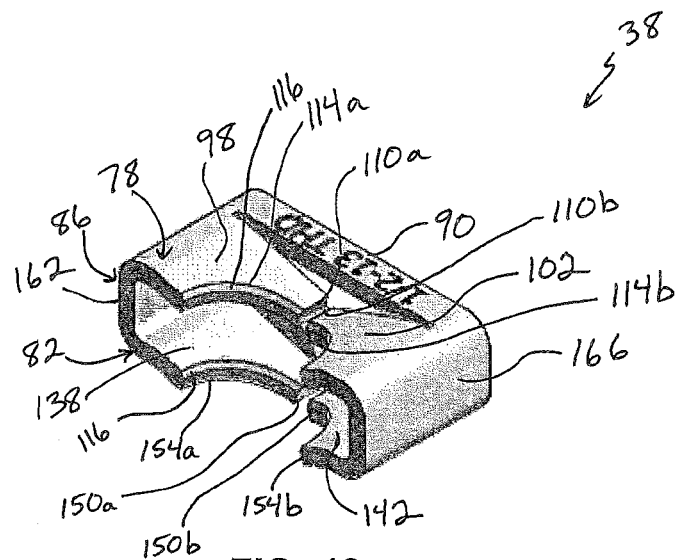
FIG. 12 is a front perspective cross-sectional view of the double-thread speed nut shown in FIG. 9 taken along line A-A of FIG. 9.
Figure 13:
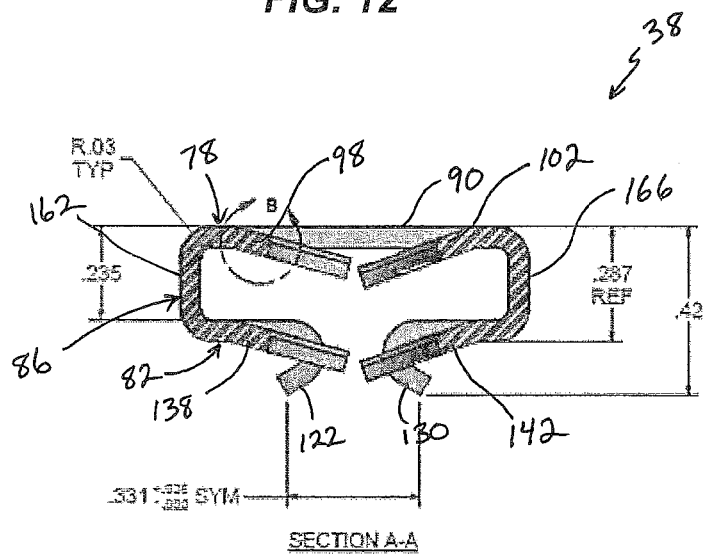
FIG. 13 is a front elevation cross-sectional view of the double-thread speed nut shown in FIG. 9 taken along line A-A of FIG. 9.
Figure 14:
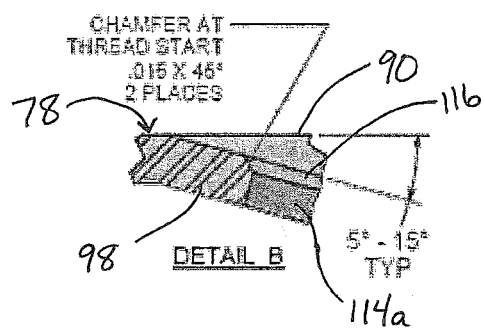
FIG. 14 is a front elevation detail view of Detail B of FIG. 13.

FIGS. 4-6 depict one embodiment of a double-thread speed nut 38 threadably engaged with three different types of bolts each having an external thread 62. FIGS. 4-6 depict a double-thread speed nut 38 threadably engaged with a UNC thread bolt 66, a coil-thread bolt 70, and a lag, or auger, bolt 74, respectfully. FIGS. 4-6 generally depict the versatility of one embodiment of a double-thread speed nut 38. For example, in one configuration, a double-thread speed nut 38 is configured to threadably engage a ½-13 UNC thread bolt, a ½-6 coil-thread bolt, and a ½" lag, or auger, bolt. Also, as depicted, the double-thread speed nut 38 can accommodate a right-hand and a left-hand thread. Moreover, as should be appreciated, the dimensions of the double-thread speed nut 38 can be altered to accommodate any bolt, including any thread. As illustrated in FIGS. 4-6, in one embodiment the double-thread speed nut 38 has a square geometry.

FIGS. 7-14 illustrate one embodiment of a double-thread speed nut 38. As illustrated, the double-thread speed nut 38 includes an upper portion 78, a lower portion 82 spaced apart from the upper portion 78 by a gap, and a sidewall portion 86 integrally connecting the upper portion 78 and the lower portion 82.

As depicted, the upper portion 78 comprises a first bridge 90, a second bridge 94, a first upper portion plate 98, and a second upper portion plate 102. Generally, the first upper portion plate 98 and the second upper portion plate 102 oppose each other and are positioned between the first bridge 90 and the second bridge 94. The first bridge 90 and the second bridge 94 generally protect the first upper portion plate 98 and the second upper portion plate 102. For example, the first bridge 90 and the second bridge 94 protect the upper plates from side impact. In one embodiment, the first bridge 90 and the second bridge 94 are substantially parallel to each other.

Further, as depicted, the first upper portion plate 98 and the second upper portion plate 102 are downwardly oriented from an upper surface 106 of the upper portion 78 and are substantially planar. The first upper portion plate 98 includes a leading edge 110a that has an arcuate portion 114a configured to matingly engage an external thread of a bolt, and the second upper portion plate 102 includes a leading edge 110b that has an arcuate portion 114b configured to matingly engage an external thread of a bolt. The arcuate portions 114a, 114b have a thickness that is less than the pitch of an external thread of a preselected bolt, and the arcuate portions 114a, 114b may include at least one chamfered edge 116 that corresponds to the angle of the external thread of the preselected bolt.

The arcuate portions 114a, 114b generally define an upper portion aperture 118 configured to receive the preselected bolt. For example, the upper portion aperture 118 generally has a diameter that is greater than a minor diameter, but smaller than a major diameter, of a preselected externally-threaded bolt. Thus, when a bolt is threaded into the upper portion 78 of the double-thread speed nut 38, the external thread of the bolt is threaded between the leading edges 110a, 110b of the first upper portion plate 98 and the second upper portion plate 102. The arcuate portion 114a will engage the external thread of the bolt on one side of the preselected bolt, and the arcuate portion 114b will engage the external thread of the bolt on an opposing side of the preselected bolt. The first upper portion plate 98 and the second upper portion plate 102 may elastically deform to allow the leading edges 110a, 110b and the arcuate portions 114a, 114b to conform to the helix of the external thread of the preselected bolt. In addition, the first upper portion plate 98 and the second upper portion plate 102 may elastically deform upward upon tightening of the bolt. The upward deformation of the first upper portion plate 98 and the second upper portion plate 102 may decrease the distance between the arcuate portions 114a, 114b, thereby reducing the diameter of the upper portion aperture 118 to a distance in which the arcuate portions 114a, 114b may squeeze the shank and/or external thread of the bolt. As should be appreciated by one of skill in the art, a given configuration of the first upper portion plate 98 and the second upper portion plate 102 may be able to accommodate more than one type of bolt.

In an alternative embodiment, the upper portion 78 may comprise only one downwardly oriented substantially planar plate. In this embodiment, an aperture may be formed entirely within the single downwardly oriented substantially planar plate and configured to receive an externally-threaded bolt. An example of this alternative upper portion plate is described in U.S. Pat. No. 6,899,240, which is hereby incorporated herein by reference in its entirety. The downwardly oriented substantially planar plate described in U.S. Pat. No. 6,899,240 is identified as a retainer.

Referring back to FIGS. 7-14, a lower portion 82 is spaced apart from the upper portion 78 by a gap. The lower portion 82 comprises a first foot segment 122, a second foot segment 126, a third foot segment 130, a fourth foot segment 134, a first lower portion plate 138, and a second lower portion plate 142. Generally, the first lower portion plate 138 opposes the second lower portion plate 142. The first lower portion plate 138 is positioned between the first foot segment 122 and the second foot segment 126, and the second lower portion plate 142 is positioned between the third foot segment 130 and the fourth foot segment 134. The feet segments generally protect the first lower portion plate 138 and the second lower portion plate 142. For example, the feet segments protect the lower plates from side impact. As another example, the feet segments may be configured to elevate the lower plates above a surface to prevent the lower plates from being bent upward. In addition, the feet segments may be configured to provide stability to, or prevent rocking of, the nut when the nut is positioned in a horizontal orientation. Further, if the nut 38 is utilized in association with a subgrade vault 2 as depicted in FIGS. 2-3, the feet segments may be configured to prevent the nut 38 from entering the recessed region 50. Moreover, in one embodiment, the feet segments may be configured to alter the height of the nut 38 to correspond to a height of a square nut.

As depicted, the first lower portion plate 138 and the second lower portion plate 142 are downwardly oriented from an upper surface 146 of the lower portion 82 and are substantially planar. The first lower portion plate 138 includes a leading edge 150a that has an arcuate portion 154a configured to matingly engage an external thread of a bolt, and the second lower portion plate 142 includes a leading edge 150b that has an arcuate portion 154b configured to matingly engage an external thread of a bolt. The arcuate portions 154a, 154b have a thickness that is less than the pitch of an external thread of a preselected bolt, and the arcuate portions 154a, 154b may include at least one chamfered edge 116 that corresponds to the angle of the external thread of the preselected bolt.

The arcuate portions 154a, 154b generally define a lower portion aperture 158 that is axially aligned with the upper portion aperture 118 and is configured to receive the preselected bolt. For example, the lower portion aperture 158 generally has a diameter that is greater than a minor diameter, but smaller than a major diameter, of a preselected externally-threaded bolt. Thus, when a bolt is threaded into the lower portion 82 of the double-thread speed nut 38, the external thread of the bolt is threaded between the leading edges 150*a*, 150*b* of the first lower portion plate 138 and the second lower portion plate 142. The arcuate portion 154*a* will engage the external thread of the bolt on one side of the preselected bolt, and the arcuate portion 154*b* will engage the external thread of the bolt on an opposing side of the preselected bolt. The first lower portion plate 138 and the second lower portion plate 142 may elastically deform to allow the leading edges 150*a*, 150*b* and the arcuate portions 154*a*, 154*b* to conform to the helix of the external thread of the preselected bolt.

In addition, the first lower portion plate 138 and the second lower portion plate 142 may elastically deform upward upon tightening of the bolt. The upward deformation of the first lower portion plate 138 and the second lower portion plate 142 may decrease the distance between the arcuate portions 154*a*, 154*b*, thereby reducing the diameter of the lower portion aperture 158 to a distance in which the arcuate portions 154*a*, 154*b* may squeeze the shank and/or external thread of the bolt. In this fashion, the elastic deformation of the first upper portion plate 98, the second upper portion plate 102, the first lower portion plate 138, and/or the second lower portion plate 142 may increase the torque capability of the double-thread speed nut 38 to provide similar torque capability as a solid nut while weighing substantially less than the solid nut. In one embodiment, a double-thread speed nut 38 weighs about 50 to 75% less than a solid nut with comparable torque capabilities. In another embodiment, a double-thread speed nut 38 weighs about 60% less than a solid nut with comparable torque capabilities. The reduction in weight, yet retention of torque capability, results in a significant reduction in the amount of material utilized in manufacturing a double-thread speed nut 38 as compared to corresponding solid nuts.

As should be appreciated by one of skill in the art, a given configuration of the first lower portion plate 138 and the second lower portion plate 142 may be able to accommodate more than one type of bolt. In the depicted embodiment, the first lower portion plate 138 is substantially parallel to the first upper portion plate 98, and the second lower portion plate 142 is substantially parallel to the second upper portion plate 102. Further, as depicted, the first lower portion plate 138, the first foot segment 122, and the second foot segment 126 generally oppose, and are not connected to, the second lower portion plate 142, the third foot segment 130, and the fourth foot segment 134. In this configuration, as is later discussed, the double-thread speed nut 38 can be formed from a single strip of material.

Referring back to FIGS. 7-14, a sidewall portion 86 integrally connects the upper portion 78 and the lower portion 82. The sidewall portion 86 comprises a first sidewall 162 opposed by, and spaced apart from, a second sidewall 166. In one configuration, the first sidewall 162 and the second sidewall 166 are substantially parallel. As depicted, the sidewall portion 86 has two open sides which allow dirt and/or debris to exit from the double-thread speed nut 38, which generally reduces the heat generated when threadably engaging the nut 38 with a bolt. The height of the sidewall portion 86 generally defines the gap between the upper portion 78 and the lower portion 82. The dimensions of the gap may be altered depending upon an external thread of a preselected bolt. Generally, the gap corresponds to a pitch of an external thread of a preselected bolt. For example, the gap may be a multiple of the pitch of the external thread of the preselected bolt. Thus, the corresponding upper and lower plates may be spaced apart by a gap that corresponds to the pitch of the external thread of the preselected bolt, thereby ensuring the double-thread speed nut 38 will threadably engage the external thread of the bolt. In one embodiment, the plates are sufficiently flexible to accommodate for a mismatched pitch between a preselected bolt and the upper and lower plates. In one embodiment, the first bridge 90 and the second bridge 94 integrally connect the first sidewall 162 and the second sidewall 166, thereby enabling the double-thread speed nut 38 to be constructed from a single strip of material.

According to one embodiment, the first upper portion plate 98, the second upper portion plate 102, the first lower portion plate 138, and the second lower portion plate 142 are angled between about five to about fifteen degrees relative to a horizontal plane. In another embodiment, the first upper portion plate 98 and the second upper portion plate 102 are oriented at different angles. In a similar embodiment, the first lower portion plate 138 and the second lower portion plate 142 are oriented at different angles. In one embodiment, the first upper portion plate 98 and the first lower portion plate 138 are substantially parallel, and the second upper portion plate 102 and the second lower portion plate 142 are substantially parallel. In one embodiment, the double-thread speed nut 38 comprises a rectangular shape, which may be square.

Figure 15:
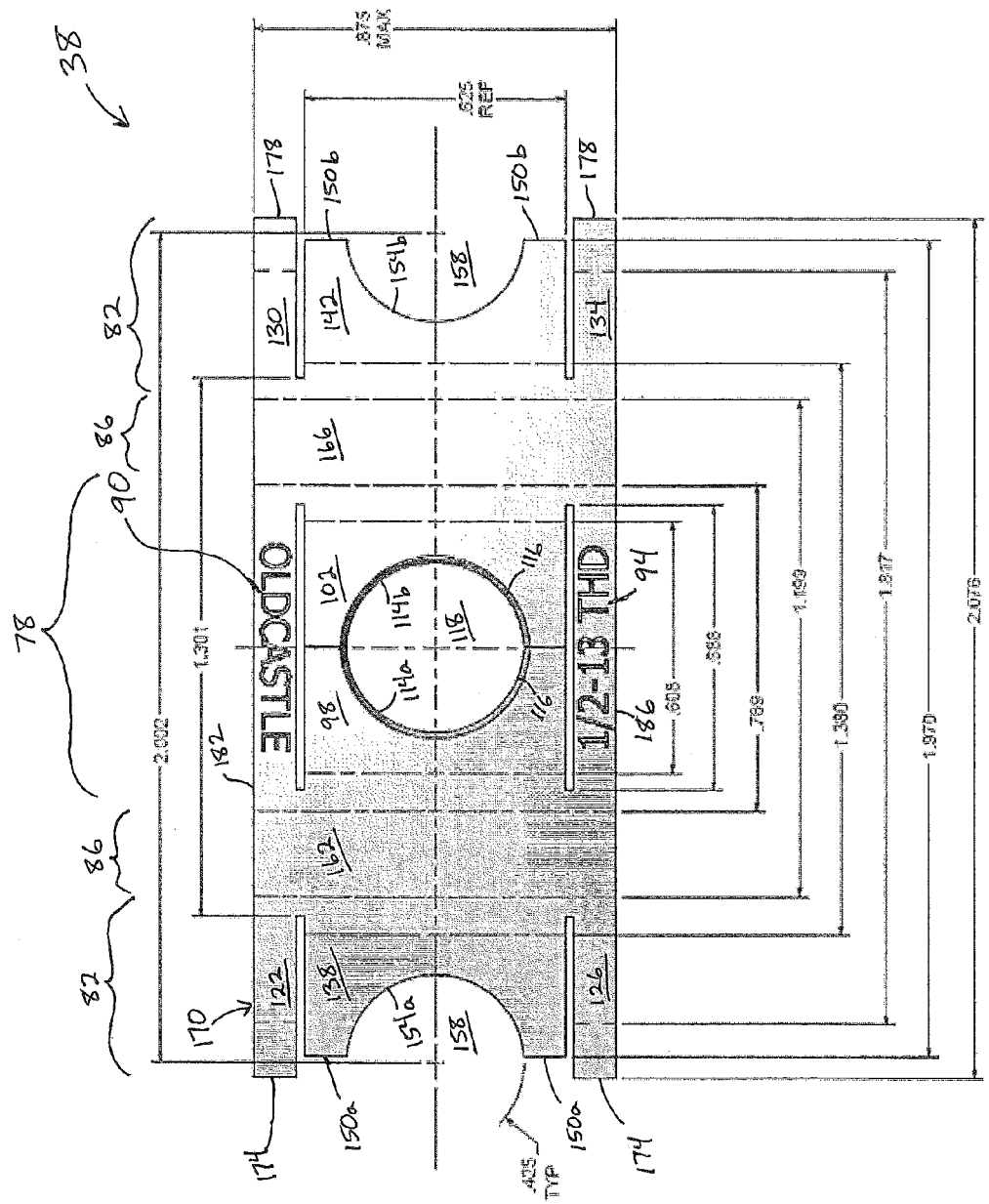
FIG. 15 is a top plan view of one embodiment of a flat pattern of a double-thread speed nut.

Referring now to FIG. 15, a top plan view of one embodiment of a flat pattern of a double-thread speed nut 38 is provided. To manufacture a double-thread speed nut 38 according to one embodiment, a substantially planar strip of material is obtained. In one embodiment, the material is sheet metal. The planar strip generally includes a first end 174, a second end 178, a first side 182, and a second side 186. A first aperture 118 may be formed near the center of the strip 170. Generally, the first aperture 118 is associated with an area of the strip 170 defining an upper portion 78 of the double-thread speed nut 38.

The manufacturing process also includes forming a first plate 138 near the first end 174 of the strip 170 and a second plate 142 near the second end 178 of the strip 170. The first plate 138 is formed to have a leading edge 150*a* with an arcuate portion 154*a*, and the second plate 142 is formed to have a leading edge 150*b* with an arcuate portion 154*b*. As depicted, the arcuate portion 154*a* of the first plate 138 is directed away from the arcuate portion 154*b* of the second plate 142.

Once the first plate 98 and the second plate 102 have been formed, the first end 174 and the second end 178 are folded relative to the upper portion 78 of the double-thread speed nut 38 to define a first sidewall 162 and a second sidewall 166 of the double-thread speed nut 38. In this folded state, the first sidewall 162 and the second sidewall 166 form a sidewall portion 86 of the double-thread speed nut 38.

Next, the first end 174 and the second end 178 of the strip 170 are folded relative to the first sidewall 162 and the second sidewall 166, respectively, to define a lower portion 82 of the double-thread speed nut 38. In this folded state, the arcuate portion 154*a* of the first plate 138 opposes the arcuate portion 154*b* of the second plate 142 to define a second aperture 158 that is axially aligned with the first aperture 118.

Optionally, a third plate 98 and a fourth plate 102 may be formed near the center of the strip 170. The third plate 98 may be formed to have a leading edge with an arcuate portion 114*a*, and the fourth plate 102 may be formed to have a leading edge with an arcuate portion 114*b*. As depicted, the arcuate portion 114*a* of the third plate 98 opposes the arcuate portion 114*b* of the fourth plate 102 to define the first aperture 118. Generally, the third plate 98 and the fourth plate 102 are associated with the upper portion 78 of the manufactured double-thread speed nut 38.

Figure 16:
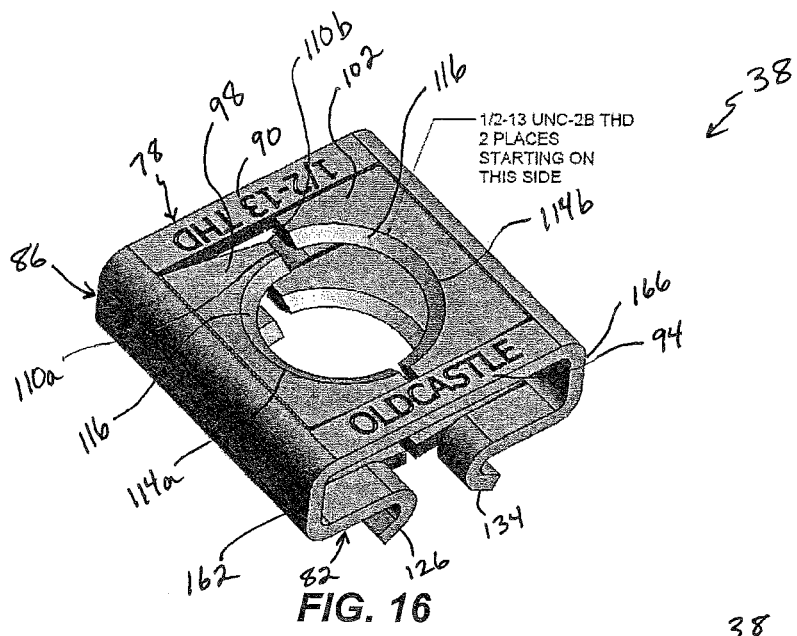
FIG. 16 is a front top perspective view of one embodiment of a double-thread speed nut.
Figure 17:
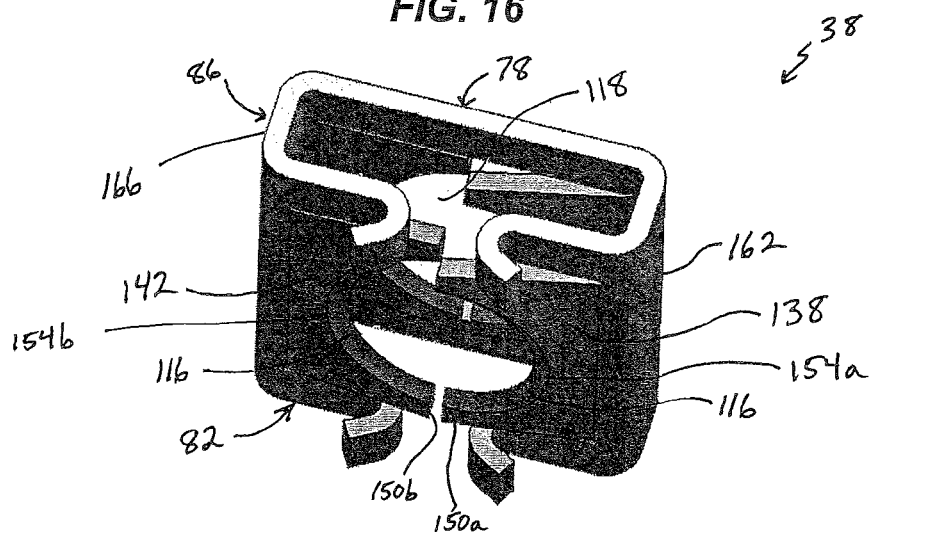
FIG. 17 is a back bottom perspective view of the double-thread speed nut shown in FIG. 16.
Figure 18:
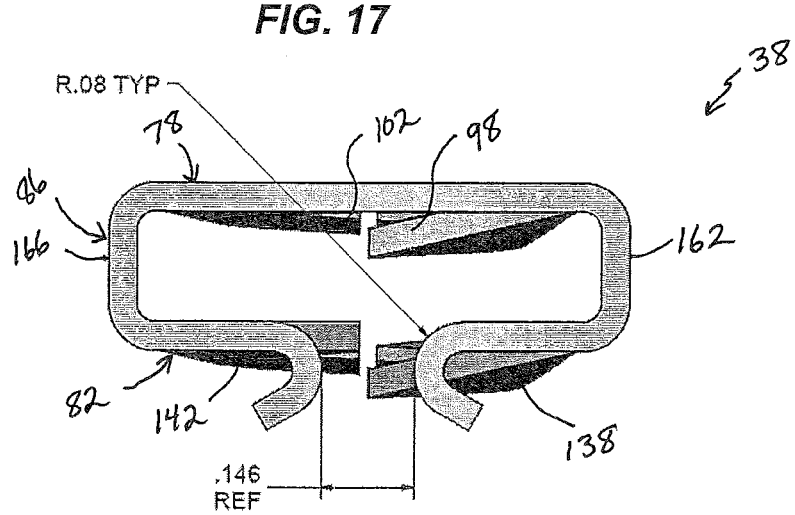
FIG. 18 is a back elevation view of the double-thread speed nut shown in FIG. 16.

Referring to FIGS. 16-18, another embodiment of a double-thread speed nut 38 is provided. As illustrated, the double-thread speed nut 38 includes an upper portion 78, a lower portion 82 spaced apart from the upper portion 78 by a gap, and a sidewall portion 86 integrally connecting the upper portion 78 and the lower portion 82.

As depicted, the upper portion 78 comprises a first upper portion plate 98 and a second upper portion plate 102. In addition, the lower portion 82 comprises a first lower portion plate 138 and a second lower portion plate 142. In contrast to the embodiment depicted in FIGS. 7-14, the plates 98, 102, 138, 142 depicted in FIGS. 16-18 are contoured. As illustrated, the first upper portion plate 98 and the second upper portion plate 102 are contoured such that arcuate portions 114a, 114b substantially correspond to a helix of an external thread of a bolt. Similarly, the first lower portion plate 138 and the second lower portion plate 142 are contoured such that arcuate portions 154a, 154b substantially correspond to a helix of an external thread of a bolt. One opposing set of leading edges 110a, 110b of the upper portion 78 of the double-thread speed nut 38 are vertically offset from each other to allow passage of an external thread of a bolt. Similarly, one opposing set of leading edges 150a, 150b of the lower portion 82 of the double-thread speed nut 38 are vertically offset from each other to allow passage of an external thread of a bolt.

Generally, the first upper portion plate 98 and the second upper portion plate 102 oppose each other and are positioned between the first bridge 90 and the second bridge 94. However, in an alternative embodiment, the upper portion 78 may be substantially continuous. In this alternative embodiment, the upper portion 78 does not include a first bridge 90, a second bridge 94, a first upper portion plate 98, or a second upper portion plate 102. Rather, a first aperture 118 may be formed near the center of the strip 170 having a perimeter configured to correspond to a helix of an external thread of a bolt. A slot extending perpendicular to the perimeter of the first aperture 118 may be formed near one side of the first aperture 118 and may intersect the perimeter of the first aperture. The slot may be configured to accommodate the passage of an external thread of a bolt, thereby allowing the bolt to be threaded through the first aperture 118. For example, the slot may form one opposing set of leading edges 110a, 110b that are vertically offset from each other to allow passage of an external thread of a bolt.

Figure 19:
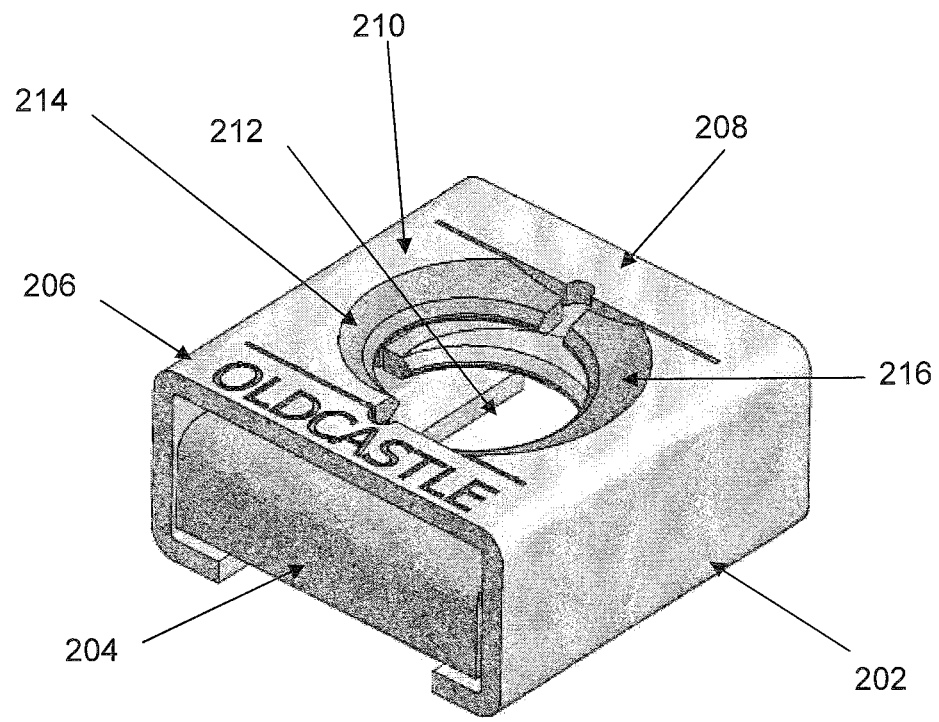
FIG. 19 is a perspective view of a double-thread speed nut according to one embodiment.
Figure 20:
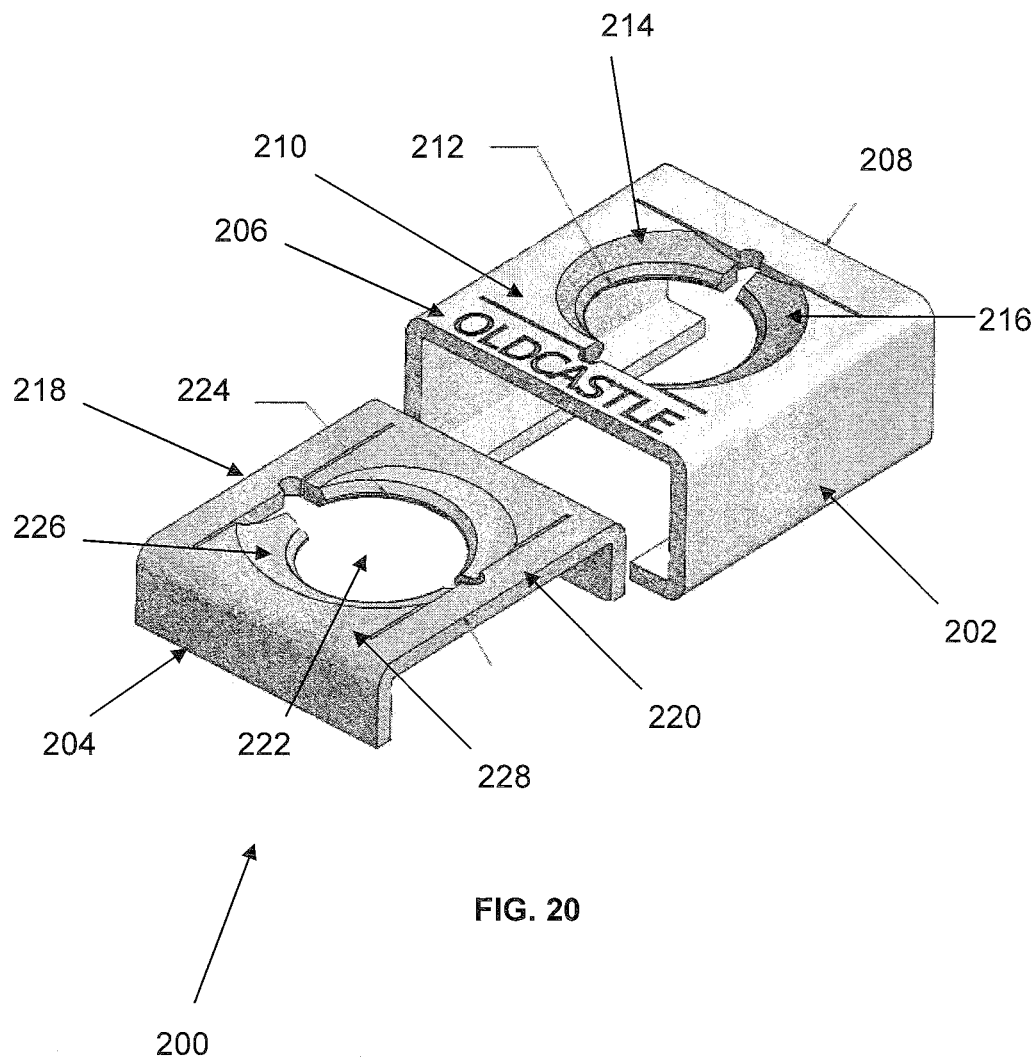
FIG. 20 is a perspective view of a double-thread speed nut according to one embodiment.
Figure 21:
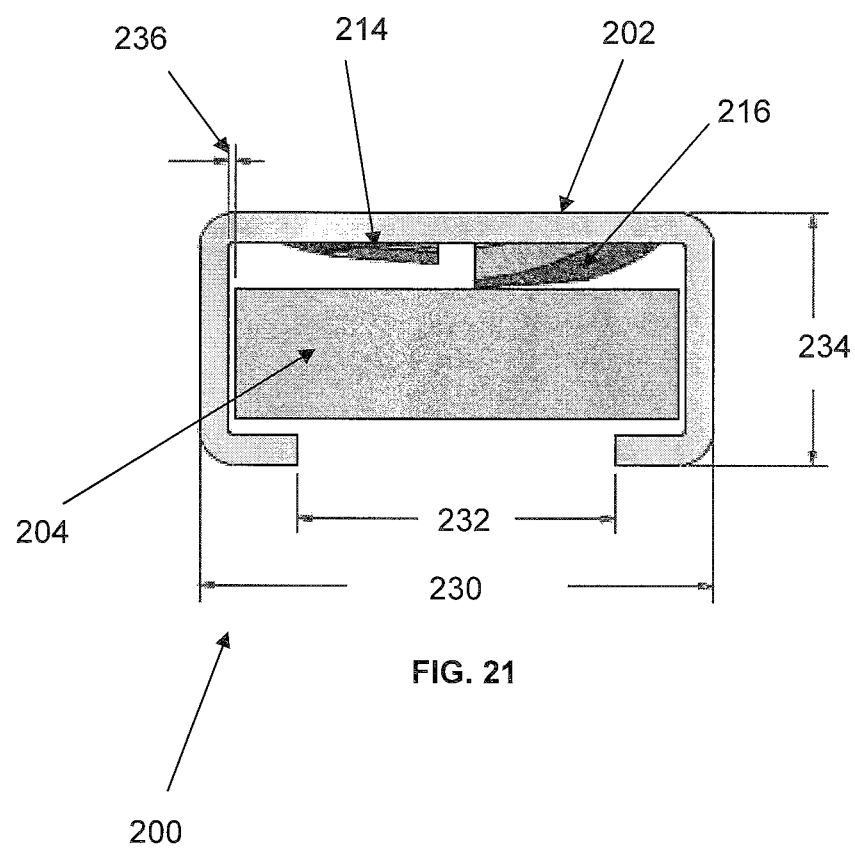
FIG. 21 is a side elevation view of a double-thread speed nut according to one embodiment.

FIGS. 19-21 depict one embodiment of a nut 200 comprising a multi-piece construction. Referring to FIG. 19, a nut 200 is provided comprising a first member 202 and second member 204, the second member 204 being received by and provided substantially within a void space of the first member 202. The first member 202 comprises first 206 and second 208 bridge members, the first 206 and second 208 bridge members being disposed substantially parallel to one another and joining opposing side walls of the nut 200. An upper portion 210 of the nut 200 comprises an aperture 212 for receiving a bolt. Peripheries of the aperture 212 comprise at least one downwardly sloping feature and preferably first 214 and second 216 downwardly sloping features extending between the upper surface 210 of the nut 200 and a substantially annular circumference of the aperture. A second member 204 is provided in combination with the first member 202. The second member 204 is slidably disposed within the first member 202 and comprises nut and bolt securement features as shown and described herein.

FIG. 20 is a perspective view of the nut 200 according to the embodiment of FIG. 19 with the second member 204 disengaged or withdrawn from the first member 202. The second member 204 comprises first 218 and second 220 bridge members provided between opposing side walls and being substantially parallel with one another. First 218 and second 220 bridge members are provided adjacent an aperture 222 of the second member 204. The aperture 222 is adapted to be disposed substantially concentrically with the aperture 212 of the first member 202 when the second member 204 is nested or placed within the first member first member 202. Peripheries of the aperture 222 comprise at least one downwardly sloping feature and preferably first 224 and second 226 downwardly sloping features extending between the upper surface 228 of the second member 204 and a substantially annular circumference of the aperture.

Interior portions of the downwardly sloping features 214, 216, 224, 226 may be offset with respect to one another to engage a thread pattern of one or more known bolts. This offset will be determined based on the known or standard thread size and pattern.

FIG. 21 is a side elevation view of a nut 200 according to one embodiment and comprising first 202 and second 204 portions. First 214 and second 216 downwardly sloping features are depicted, wherein the second downwardly sloping feature 216 is offset and disposed at a lower position with respect to the first downwardly sloping feature 214. Such an offset is provided so that interior lip or peripheral portions of the features are provided to engage one or more standard thread patterns on a bolt. In various embodiments, the first member 202 comprises a width 230 of between approximately 0.50 and 1.00 inches. In certain embodiments, the first member 202 comprises a width 230 of between approximately 0.750 and 0.90 inches. In a preferred embodiment, the first member 202 comprises a width of approximately 0.860 inches. Various embodiments contemplate that the nut 200 comprises a substantially square geometry such that a length corresponds to the width. In various embodiments, the first member 202 comprises a height 234 of between approximately 0.25 and 0.75 inches. In certain embodiments, the first member 202 comprises a height 234 of between approximately 0.40 and 050 inches. In a preferred embodiment, the first member 202 comprises a height 234 of approximately 0.418 inches. A gap distance 232 is provided in a lower portion of the nut 200, the gap distance being between approximately 0.40 inches and 0.60 inches. In one embodiment, the gap distance 232 is provided as approximately 0.531 inches. A width of the second member 204 is provided such that there is a tolerance or gap space 236 between the first 202 and second 204 members. In various embodiments, this tolerance 236 is provided as being between approximately 0.010 inches and 0.02 inches. In certain embodiments, this tolerance 236 is contemplated as being at least 0.010 inches and preferably not less than 0.012 inches.

Figure 22:
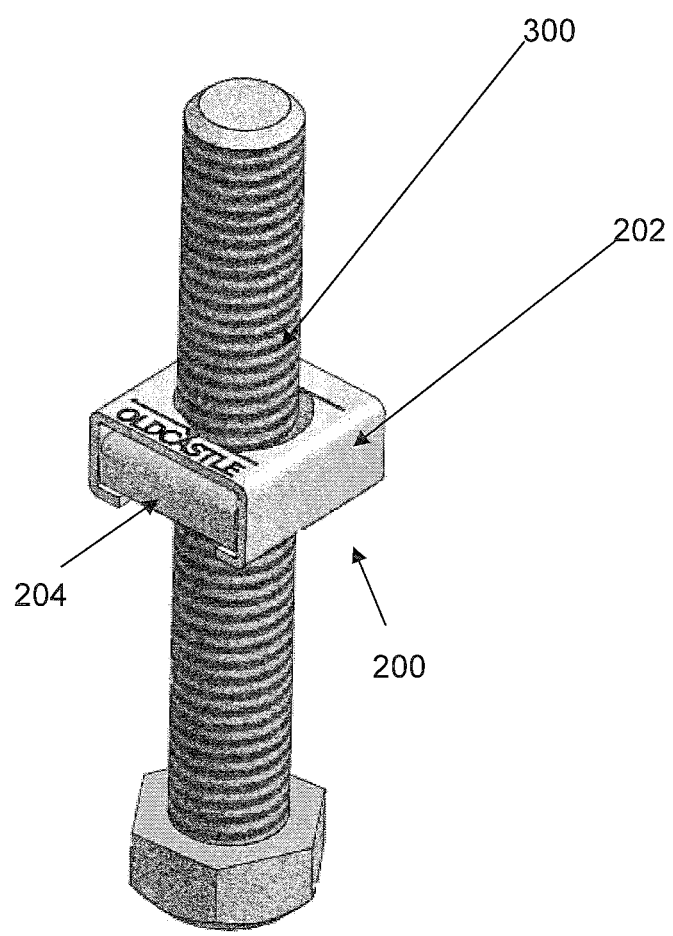
FIG. 22 is a perspective view of one embodiment of a double-thread speed nut and bolt.
Figure 23:
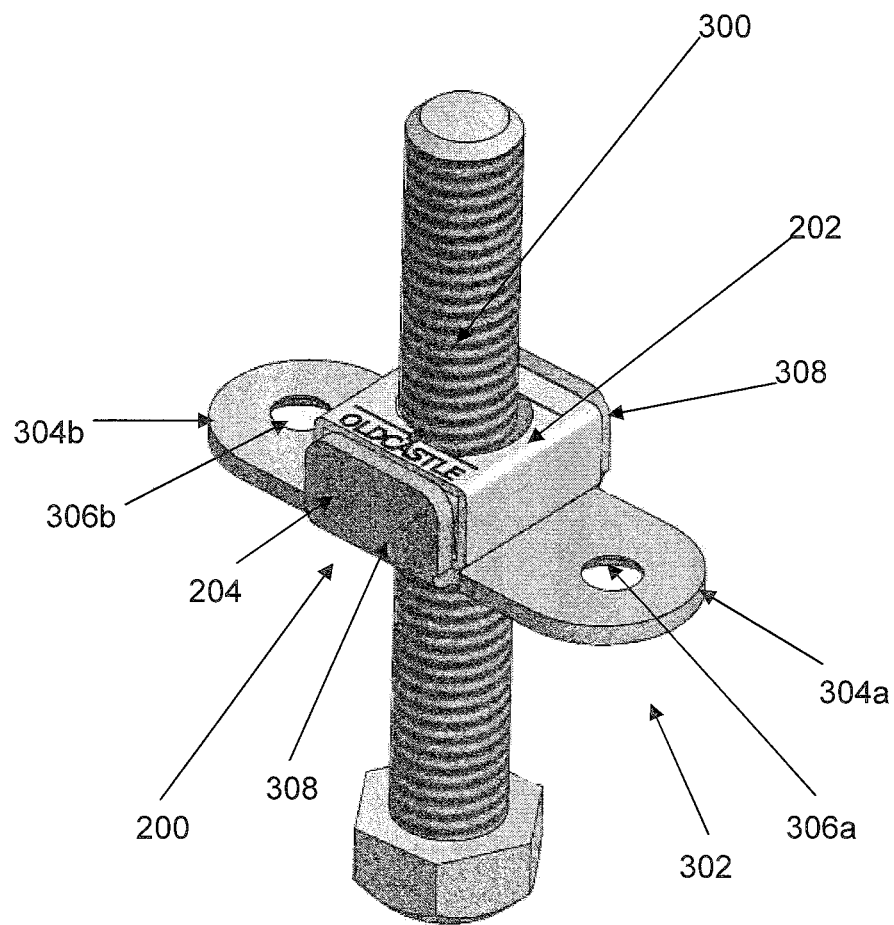
FIG. 23 is a perspective view of one embodiment of a double-thread speed nut and bolt.
Figure 24:
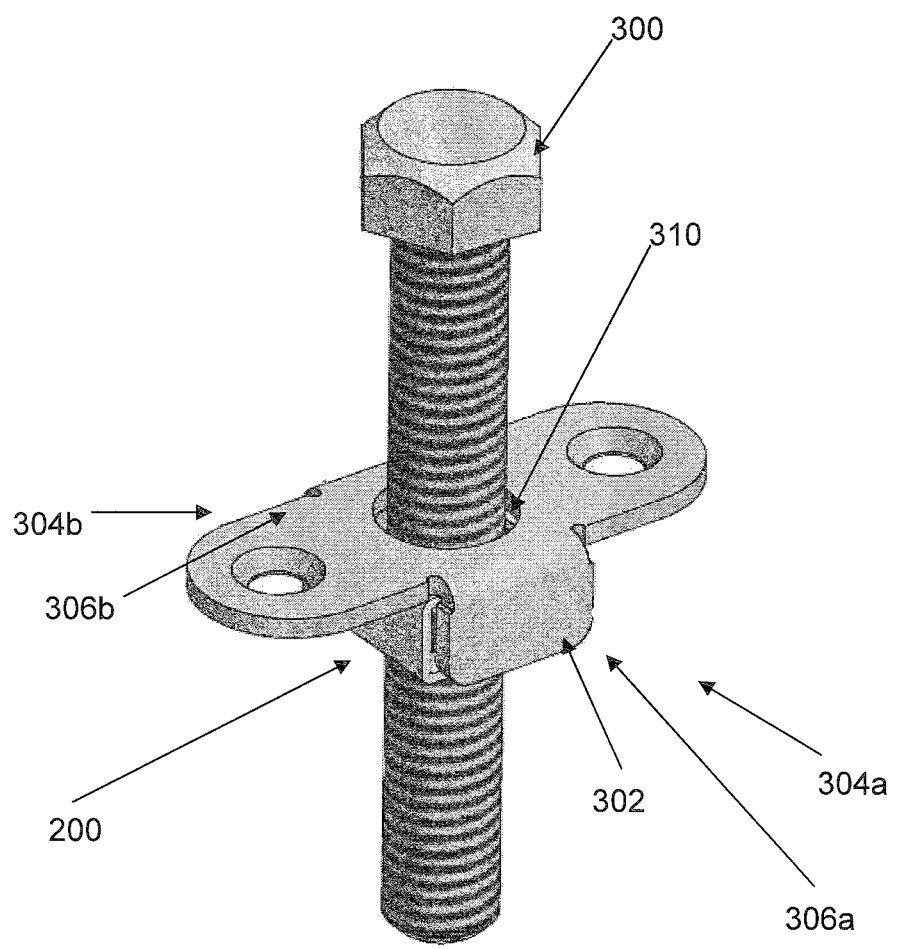
FIG. 24 is a perspective view of one embodiment of a double-thread speed nut and bolt.

FIGS. 22-24 depict one embodiment of a nut 200 with a bolt 300 disposed therein. FIG. 22 is a perspective view of one embodiment of the nut 200 provided on a bolt 300. The nut 200 is provided without a retainer and with at least a portion of the bolt 300 threaded through the first member 202 and the second member 204. FIG. 22 depicts a nut 200 of the present invention in isolation and without a retainer member. It will be recognized, however, that such an arrangement of features of the present disclosure may be provided and/or desirable where the nut is provided in close proximity to additional features, such as a vault side-wall, that prevent undesired rotation of the nut 200 and allow the bolt 300 be threaded through the nut 200 with relative ease.

FIGS. 23-24 depict one embodiment of a nut 200 disposed on a bolt 300 and further comprising a retainer bracket 302. The retainer bracket 302 comprises extension members 304a, 304b. Extension members 304a, 304b are provided to oppose rotation of the retainer bracket 302. To further assist in opposition of rotation, apertures 306a, 306b are further provided in extension members, such apertures 306a, 306b adapted for receiving additional fasteners (not shown). The retainer bracket 302 further comprises peripheral portions 308 for surrounding the nut 200 on at least two sides. As shown, peripheral portions 308 are provided substantially perpendicular to a remainder of the retainer bracket 302. The bracket 302 comprises a through hole 310 for receiving the bolt 300 and being generally aligned with the apertures in the nut 200.

While various embodiments have been described in detail, it is apparent that modifications and alterations of those embodiments will occur to those skilled in the art. For example, although the folding steps of the manufacturing process have been recited in a particular order, the folding steps can be performed in various orders. In addition, various features of the disclosure are grouped together in one or more aspects, embodiments, or configurations for the purpose of streamlining the disclosure. The various features of the certain aspects, embodiments, or configurations of the disclosure may be combined in alternate aspects, embodiments, or configurations. It is to be expressly understood that such modifications and alterations are within the scope and spirit of the claimed subject matter. In addition, it should be understood that the claimed subject matter is not necessarily limited to the particular embodiments illustrated and/or described herein. Rather, the claimed subject matter, as set forth in the following claims, comprises an additional embodiment that is not limited by the foregoing description.

What is claimed is:

1. A tamper resistant closure mechanism for selectively securing a lid to a utility vault, comprising:
   a utility vault having a plurality of sidewalls and an opening;
   a cap operably engaged to said utility vault;
   a lid sized to rest on said cap and cover said opening of said utility vault;
   a locking assembly interconnected to said cap and comprising:
      an upper portion having an aperture configured to receive a bolt;
      a lower portion spaced apart from the upper portion by a gap, the lower portion comprising a first lower portion plate opposed by a second lower portion plate, the first lower portion plate and the second lower portion plate each having a leading edge with an arcuate portion configured to matingly engage an external thread of the bolt; and
      a sidewall portion, the sidewall portion comprising a first sidewall opposed by, and spaced apart from, a second sidewall, wherein the first sidewall integrally connects the upper portion and the first lower portion plate, and wherein the second sidewall integrally connects the upper portion and the second lower portion plate.

2. The tamper resistant closure mechanism of claim 1, wherein the arcuate portion of the leading edge of the first lower portion plate and of the second lower portion plate each comprise a chamfer configured to engage the external thread of the bolt.

3. The tamper resistant closure mechanism of claim 1, wherein the first lower portion plate and the second lower portion plate are contoured to correspond to a helix of the external thread of the bolt.

4. The tamper resistant closure mechanism of claim 1, wherein the lower portion further comprises at least one foot to provide stability to the nut when the nut is oriented parallel to a horizontal plane.

5. The tamper resistant closure mechanism of claim 1, wherein the nut comprises a square shape that is interchangeable with a corresponding square nut.

6. The tamper resistant closure mechanism of claim 1, wherein the upper portion further comprises a first bridge, a second bridge, and a first upper portion plate positioned between the first bridge and the second bridge, wherein the first bridge and the second bridge integrally connect the first sidewall and the second sidewall, and wherein the first upper portion plate is oriented downwardly and configured to engage the external thread of the bolt.

7. The tamper resistant closure mechanism of claim 6, wherein the upper portion further comprises a second upper portion plate positioned between the first bridge and the second bridge, wherein the second upper portion plate is oriented downwardly and opposes the first upper portion plate, and wherein the first upper portion plate and the second upper portion plate each having a leading edge with an arcuate portion configured to matingly engage the external thread of the bolt.

8. A method of manufacturing a double-thread speed nut, the method comprising:
   obtaining a substantially planar strip of material having a first end, a second end, a first side, and a second side;
   forming a first aperture near the center of the strip, the first aperture associated with an area of the strip defining an upper portion of the double-thread speed nut;
   forming a first plate near the first end of the strip, wherein the first plate has a leading edge with an arcuate portion;
   forming a second plate near the second end of the strip, wherein the second plate has a leading edge with an arcuate portion, and wherein the arcuate portion of the first plate is directed away from the arcuate portion of the second plate;
   folding the first end and the second end of the strip relative to the upper portion of the double-thread speed nut to define a first sidewall and a second sidewall of the double-thread speed nut; and
   folding the first end and the second end of the strip relative to the first sidewall and the second sidewall of the double-thread speed nut to define a lower portion of the double-thread speed nut, wherein the arcuate portion of the first plate opposes the arcuate portion of the second plate to define a second aperture that is axially aligned with the first aperture.

9. The method of claim 8, further comprising forming a chamfer in the arcuate portion of the leading edge of the first plate and the second plate.

10. The method of claim 8, further comprising forming at least one foot adjacent to the first plate or the second plate.

11. The method of claim 8, further comprising bending the first plate and the second plate so that the arcuate portion of the first plate and of the second plate correspond to a helix of an external thread of a bolt.

12. The method of claim 8, further comprising forming a third plate and a fourth plate near the center of the strip, wherein the third plate and the fourth plate each have a leading edge with an arcuate portion, wherein the arcuate portion of the third plate opposes the arcuate portion of the fourth plate to define the first aperture, and wherein the first plate and the second plate are associated with the upper portion of the double-thread speed nut.

13. The method of claim 8, further comprising bending the first plate and the third plate downwardly at a first angle relative to a horizontal plane and bending the second plate and the fourth plate downwardly at a second angle relative to the horizontal plane, wherein the first angle and the second angle are different.

\* \* \* \* \*